United States Patent
Buys (10) Patent No.: US 9,438,495 B2
(45) Date of Patent: Sep. 6, 2016

(54) VISUALIZATION OF RESOURCES IN A DATA CENTER

(71) Applicant: Amazon Technologies, Inc., Reno, NV (US)

(72) Inventor: Willem Jacob Buys, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 284 days.

(21) Appl. No.: 13/855,462

(22) Filed: Apr. 2, 2013

(65) Prior Publication Data

US 2014/0297835 A1    Oct. 2, 2014

(51) Int. Cl.

| G06F 15/173 | (2006.01) |
| --- | --- |
| H04L 12/26 | (2006.01) |
| H04L 12/24 | (2006.01) |
| G06F 9/455 | (2006.01) |
| G06F 9/50 | (2006.01) |

(52) U.S. Cl.
CPC ........... *H04L 43/0817* (2013.01); *H04L 41/22* (2013.01); *G06F 9/45558* (2013.01); *G06F 9/5072* (2013.01); *G06F 2009/45591* (2013.01)

(58) Field of Classification Search
CPC . G06F 9/45558; G06F 9/5072; H04L 41/22; H04L 43/0817; H04L 43/08; H04L 29/08072; H04L 29/06; H04L 43/00; H04L 12/2602; H04L 43/0805; H04L 43/0811; H04L 43/0823; H04L 43/0876
See application file for complete search history.

(56) References Cited

U.S. PATENT DOCUMENTS

| 6,211,889 | B1 * | 4/2001 | Stoutamire | 345/442 |
| --- | --- | --- | --- | --- |
| 7,903,125 | B1 * | 3/2011 | Ayers et al. | 345/629 |
| 2011/0138391 | A1 * | 6/2011 | Cho et al. | 718/102 |
| 2011/0191460 | A1 * | 8/2011 | Sailhan et al. | 709/224 |
| 2012/0260179 | A1 * | 10/2012 | Reshadi et al. | 715/735 |
| 2013/0007262 | A1 * | 1/2013 | Akatoki et al. | 709/224 |

FOREIGN PATENT DOCUMENTS

EP    0969375 B1    4/2007

OTHER PUBLICATIONS

"Hilbert curve," From Wikipedia, the free encyclopedia, last modified on Mar. 28, 2013, 5 pages.
International Search Report for PCT/US14/32546, mailed Sep. 3, 2014, 2 pages.
Written Opinion of the International Searching Authority, mailed Sep. 3, 2014, 7 pages.

* cited by examiner

*Primary Examiner* — Mohamed Wasel
*Assistant Examiner* — Anh Nguyen
(74) *Attorney, Agent, or Firm* — Klarquist Sparkman, LLP (57) ABSTRACT

A system and method are disclosed for monitoring usage of resources (e.g., hosts, instances, applications, etc.) in a datacenter. Customers, developers and system administrators can collect and track metrics, gain insight, and react to keep applications and businesses running smoothly by providing system-wide visibility into resource utilization, application performance, and operational health. Users can programmatically retrieve monitoring data and view heat maps to assist in troubleshooting, spotting trends, and taking automated action based on the state of a cloud environment. Users can further monitor resources in real-time, so that metrics such as CPU utilization, latency, memory usage, transaction volumes, error rates, etc. can be visualized.

23 Claims, 8 Drawing Sheets

VISUALIZATION OF RESOURCES IN A DATA CENTER

BACKGROUND

Network-based services exist that allow customers to purchase and utilize instances of computing resources, such as virtual machine instances, on a permanent or as-needed basis. In addition to virtual machine instances, these services typically allow customers to purchase and utilize instances of other types of computing resources for use with the virtual machine instances. For example, customers might be permitted to purchase and utilize instances of data storage resources, instances of networking resources, and instances of other types of resources.

Managing network-based services, such as those described above, can be extremely complex. At least some of this complexity is attributable to the large number of instances of computing resources and other types of resources that typically exist in such a service at any given time. For example, some network-based services might utilize dozens of data centers around the world, hundreds of thousands or even millions of server computers, along with large numbers of networking components, software programs, and other types of resources. When a large number of resources are utilized by a network service in this way, it can be very difficult to visualize hosts or other network components and correlate the same with large scale events that occur.

DETAILED DESCRIPTION

A system and method are disclosed for monitoring usage of resources (e.g., hosts, instances, applications, etc.) in a datacenter. Customers, developers and system administrators can collect and track metrics, gain insight, and react to keep applications and businesses running smoothly by providing system-wide visibility into resource utilization, application performance, and operational health. Users can programmatically retrieve monitoring data and view heat maps to assist in troubleshooting, spotting trends, and taking automated action based on the state of a cloud environment. Users can further monitor resources in real-time, so that metrics such as CPU utilization, latency, memory usage, transaction volumes, error rates, etc. can be visualized and correlated to hosts having a common characteristic (similar location, recently updated, etc.). Information can be viewed describing an operational state of a resource, such as the current load being serviced by a particular data center, room of server computers, rack of server computers, individual server computer, virtual machine instance, or applications.

Figure 1:
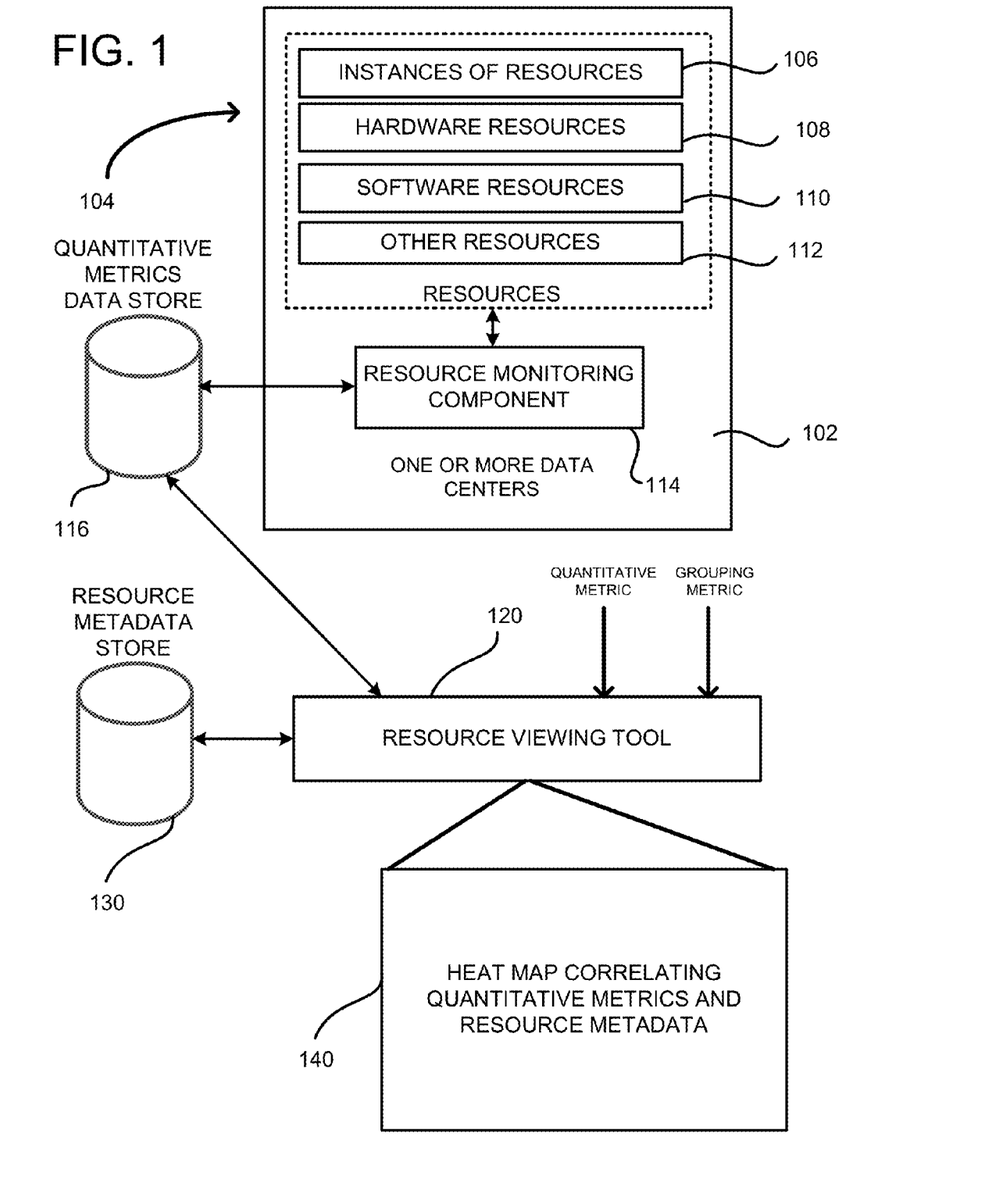
FIG. 1 is a system diagram of an embodiment for visualizing resources in a data center using a heat map to correlate a quantitative metric and a grouping metric.

FIG. 1 is a computer system diagram providing an overview description of a mechanism for visualizing resources in a distributed environment 102, including one or more data centers. In one embodiment, the system allows customers to purchase and utilize resources, shown generally at 104, including virtual machine instances 106, hardware resources 108, software resources 110, and other resources 112, on a permanent or as-needed basis. The resources can include server computers, processor configurations, memory configurations, disk storage, operating systems, network devices, etc. The operator of the distributed environment 102 may charge a fee for operating the instances to the customer that creates the instances. Various different pricing models can be utilized to charge a customer for use of instances of resources within the distributed environment 102.

In some implementations, a resource monitoring component 114 executes within or in conjunction with the distributed environment 102 and collects data regarding the state of the resources 104. For example, the resource monitoring component 114 can collect data that describes the usage characteristics of resources 104. The usage characteristics can include error rates, CPU load, memory usage, packet dropping, percentage of impaired instances on hosts, temperature, etc.

In some embodiments, once the data is obtained, the resource monitoring component 114 can store the data in a quantitative metrics data store 116. The data store 116 or the resource monitoring component 114 can allow the collected data to be made available for consumption and use by other components. For example, in some embodiments, the resource monitoring component 114 is configured to expose an application programming interface ("API") or another mechanism through which interested parties can request and receive the data collected for a particular resource 104. It should be appreciated that while the data is discussed herein primarily in the context of data describing the operational state of a resource 104, the quantitative metrics stored in the data store 116 can include other information about a resource 104, such as information describing the configuration of the resource and other aspects of a resource. In this way, the resource monitoring component 114 can be utilized to obtain virtually any type of information about a resource 104 in the distributed environment 102.

A resource viewing tool 120 can be used to collect data from the quantitative metrics data store 116 or the resource monitoring component 114 for presentation to a user. Other data bases can also be accessed, such as a resource metadata store 130. The resource viewing tool 120 can be a web-based viewing tool accessible by a client device through a lightweight application or through a browser. Alternatively, the resource viewing tool 120 can be an application located on a client device that receives data and displays the data to a user upon request. The resource viewing tool 120 can include a rendering engine for displaying a heat map in a display or viewing pane 140. Alternatively, the resource viewing tool can generate a representation of the heat map for display on a client device. The resource metadata store 130 can provide information related to the resources, but generally other than real-time usage characteristics. Some examples of data stored in the resource metadata store includes resource location (e.g., physical location in the network), amount of time since a last software upgrade, uptime, occupancy, etc. The resource metadata store 130 can thus provide a different set of metrics than the quantitative metrics available in data store 116. Input parameters including one or more grouping metrics and quantitative metrics can supplied to the resource viewing tool 120 in order to display data to the user. The input parameters can be user supplied, such as via a user interface. In some embodiments, the display 140 is a heat map that correlates the input metrics so that a user can easily visualize relationships between the data. To generate the heat map, the resource viewing tool 120 can use a locality-preserving, space-filling transformation, such as using a Hilbert curve. For example, the transformation can be from one-dimensional to two-dimensional, such as by mapping indices of the resources to two-dimensional coordinates along a Hilbert curve. In a simple examples, the heat map can be a plot of a group of host servers that are within a predefined region against a quantitative metric, such as a number of errors on a host server computer, CPU load on a host server computer, memory usage on a host server computer, network input/output transmission rates, percentage of malfunctioning instances executing on a host server computer, or a physical characteristic of a host server computer. In this way, one or more hot spots can be visualized so that a user or administrator can easily view a problem area at the data center and take corrective action.

The design of FIG. 1 can be easily modified so that the resource monitoring tool 114 supplies quantitative metrics directly to the resource viewing tool 120 rather than (or in addition to) the data store 116. Other alternative embodiments have a single data base for storing resource metadata and quantitative metrics. Still further, one or more of the data stores 116, 130 and the resource viewing tool 120 can be located within the distributed environment 102. Still further, the quantitative metrics data store 116 can be spread across multiple data stores. The resource metadata store can, likewise, be spread across multiple data stores. Such implementation details can vary widely and are not of importance to the present application.

Figure 2:
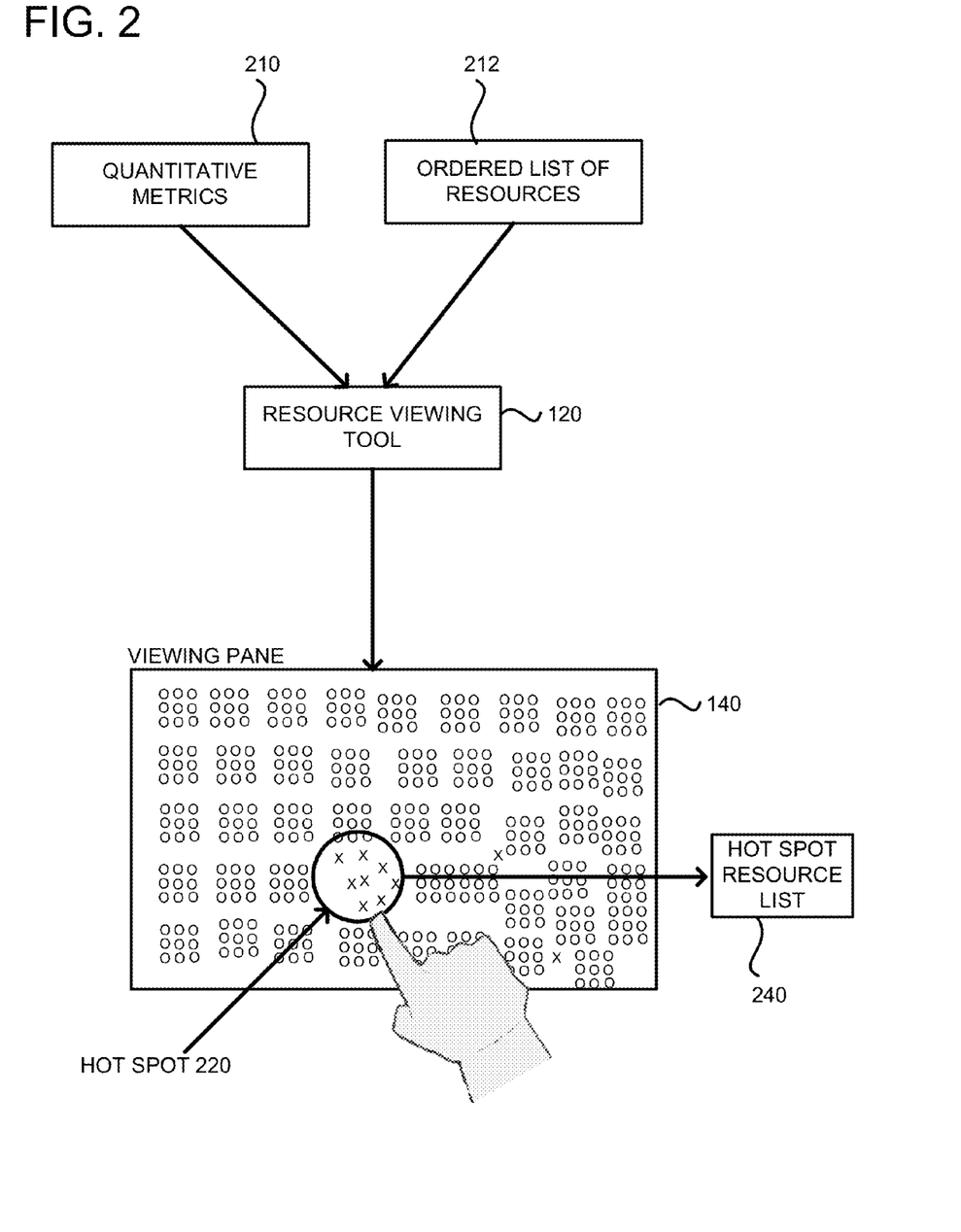
FIG. 2 shows an exemplary heat map created using quantitative metrics and a set of resources from the data center, wherein the heat map includes a user selectable hot spot.

FIG. 2 shows an exemplary heat map created using quantitative metrics and an ordered list of resources from the data center, wherein the heat map includes a user selectable hot spot. Quantitative metrics 210 and an ordered list of resources 212 can be received by the resource viewing tool 120. The quantitative metrics 210 can be supplied from a database or from a resource monitoring component and can be received in response to a request for particular subset of available metrics. Likewise, the ordered list of resources 212 can be a subset supplied from a database, such as a resource metadata store and can be received in response to a request for a particular subset of available resources, such as resources satisfying a geographic criterion. The list can be ordered based on geographic location so that resources in close physical proximity are also near each other on the list. In order to generate the viewing pane 140, an integer number of resources on the list can be used and a square root of the integer number taken so as to determine unit dimensions of the display area. For example, if there are 100 hosts on the list, the viewing pane can be a 10×10 unit square. In order to display the list of resources, which is a one-dimensional list, in a two-dimensional representation, the list can be applied to a locality preserving, space-filling curve, as is well understood in the art. An example of such a curve is a Hilbert curve, but other curves can be used.

A simple example Hilbert curve is as follows:

```
//convert d to (x,y)
void d2xy(int n, int d, int *x, int *y) {
    int rx, ry, s, t=d;
    *x = *y = 0;
    for (s=1; s<n; s*=2) {
        rx = 1 & (t/2);
        ry = 1 & (t ^ rx);
        rot(s, x, y, rx, ry);
        *x += s * rx;
        *y += s * ry;
        t /= 4;
    }
}
```

After the list of resources have passed through the above transformation, the quantitative metrics 210 can be applied to the list of resources by changing a look-and-feel of the resources that satisfy the metrics. For example, the resources that satisfy the metrics can have their color changed or depiction changed. In the illustrated example, as shown at hot spot 220, the resources satisfying the quantitative metrics are shown as an "X" and resources that do not satisfy the metrics are shown as an "0". The particular representation can be easily modified based on a desired look-and-feel. As shown, a user can select the hot spot through user touch for touch displays or through other user input devices, as is well understood in the art. In response to the user selection, a hot spot resource list 240 can be generated which is a subset of the resources 212, but within the particular geometric area on the viewing pane 140. The geometric area can be predefined or user selectable, such as through a user gesture input command. In any event, the hot spot resource list 240 can allow a user to inquire into further information about the resources in the hot spot.

Figure 3:
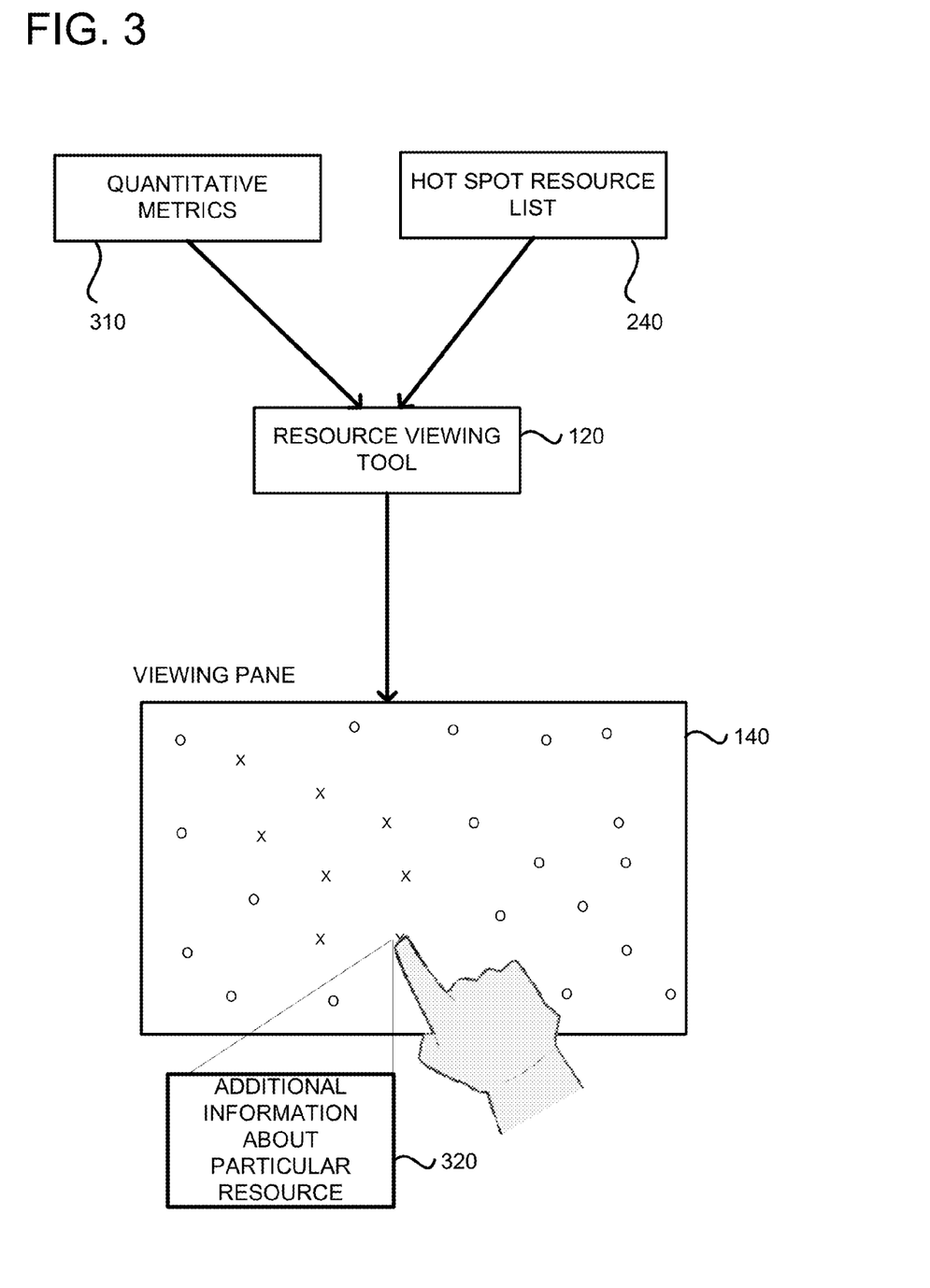
FIG. 3 shows a heat map that results from the selected hot spot of FIG. 2, with a reduced set of resources associated with the hot spot.

FIG. 3 is an example showing a result of the user selecting the hot spot from FIG. 2. The hot spot resource list 240 can be received by the resource viewing tool 120 together with a new set of user-selectable quantitative metrics 310. The process described in relation to FIG. 2 can be repeated so as to generate the viewing pane 140 with the reduced set of resources. As shown, a user can select (or mouse over) a particular resource in order to generate a sub-viewing pane 320 that provides particular details about the resource.

Figure 4:
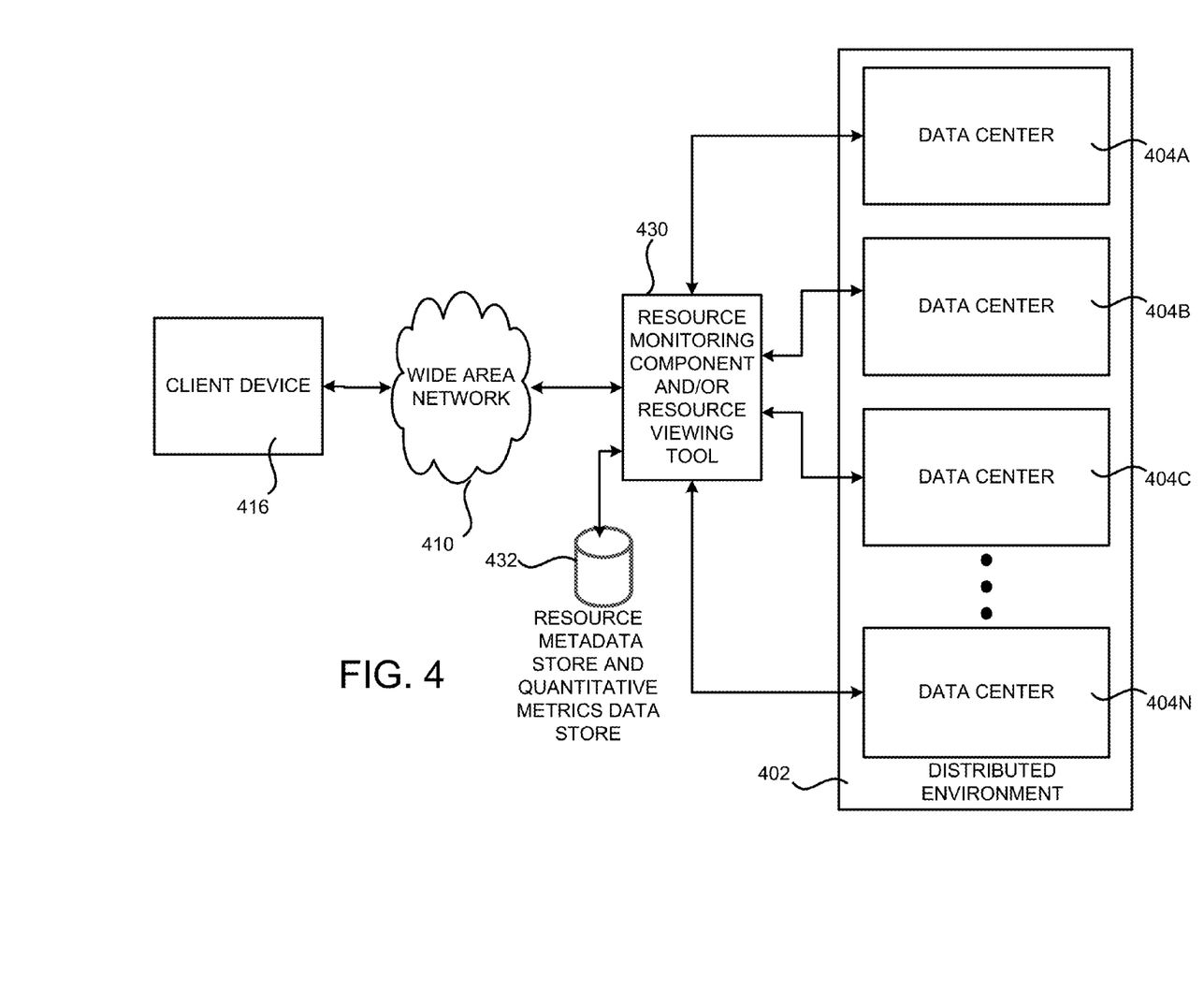
FIG. 4 shows a distributed environment including a plurality of data centers, wherein a user can visualize resources across the distributed environment.

FIG. 4 and the following description are intended to provide a brief, general description of a suitable computing environment in which the embodiments described herein may be implemented. In particular, FIG. 4 is a system and network diagram that shows an illustrative operating environment that includes a distributed environment 402. The instances of computing resources provided by the distributed execution environment 402 can include various types of resources, such as data processing resources, data storage resources, networking resources, data communication resources, and the like. Each type of resource may be general-purpose or may be available in a number of specific configurations. For example, instances of data processing resources may be available as virtual machine instances in a number of different configurations. The virtual machine instances can be configured to execute applications, including Web servers, application servers, media servers, database servers, and other types of applications. Instances of data storage resources can include file storage devices, block storage devices, and the like. Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity.

The instances of resources provided by the distributed environment 402 are enabled in one implementation by one or more data centers 404A-404N (which may be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 might also be located in geographically disparate locations. One illustrative configuration for a data center 404 that implements the concepts and technologies disclosed herein is described below with regard to FIG. 5.

Users of the distributed environment 402 can access the resources provided by the data centers 404 over a suitable data communications network, such as a Wide Area Network ("WAN") 410 and through a client device 416, such as a computer. Although a WAN 410 is illustrated, it should be appreciated that a local-area network ("LAN"), the Internet, or any other networking topology known in the art that connects the data centers 404 to the client device 416 can be utilized. It should also be appreciated that combinations of such networks might also be utilized.

Positioned intermediate the WAN 410 and the distributed environment 402 can be a resource monitoring component and/or a resource viewing tool 430. Either one or both can be coupled to one or more databases 432 including a resource metadata store and a quantitative metrics data store. In this embodiment, the resource monitoring component is positioned outside of the data centers 404 so as to collect data in parallel from the data centers. Additionally, the resource viewing tool is shown as a web-based application that can provide data to a client device for display, such as data needed for displaying a heat map. As previously described, in alternative embodiments, the resource viewing tool can be positioned on the client device 416, such as in the form of an application. Additionally, the resource monitoring component can be positioned in one or more of the data centers 404.

Figure 5:
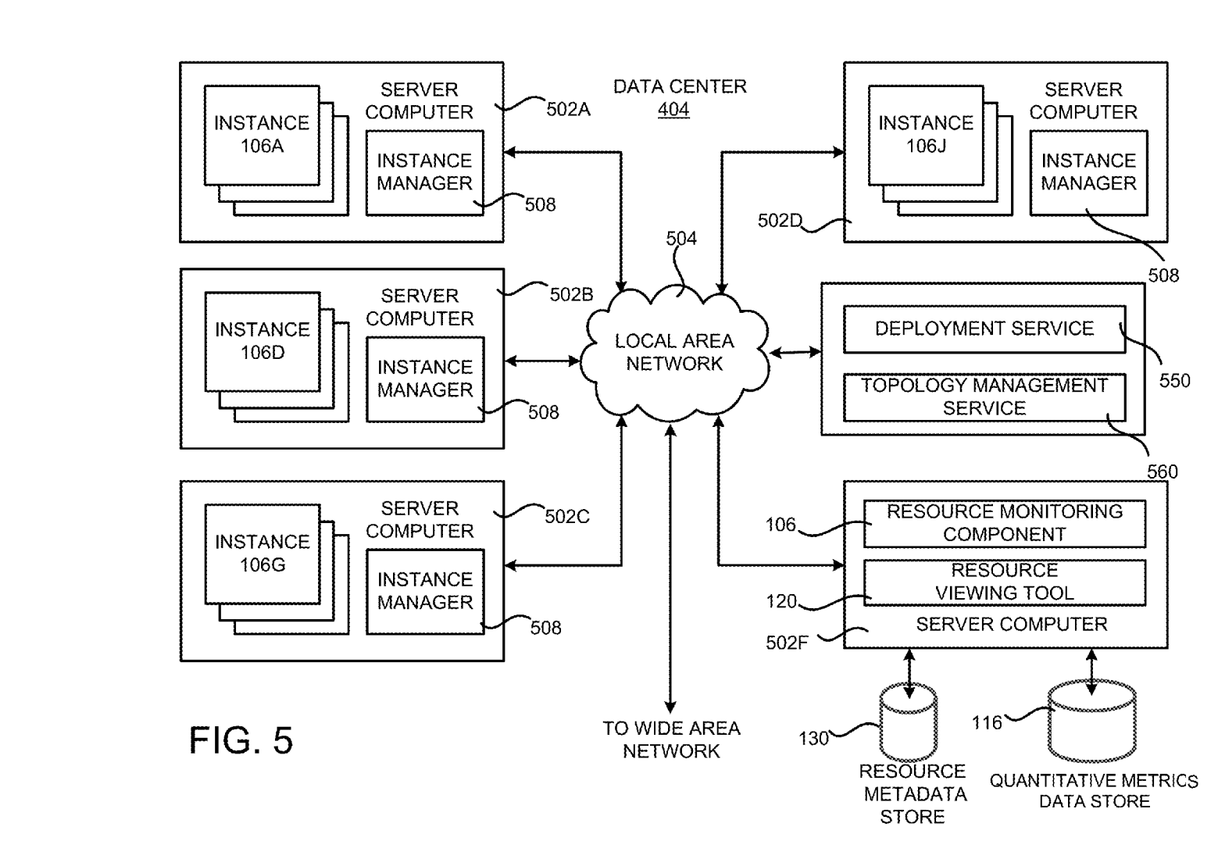
FIG. 5 is a computing system diagram that illustrates one configuration for a data center.

FIG. 5 is a computing system diagram that illustrates one configuration for a data center 404 that implements a distributed environment 402. The example data center 404 shown in FIG. 5 includes several server computers 502A-502F (which may be referred to herein singularly as "a server computer 502" or in the plural as "the server computers 502") for providing instances of resources. The server computers 502 can be standard tower or rack-mount server computers configured appropriately for providing the computing resources described herein. For example, in one implementation the server computers 502 are configured to provide instances 106 of resources (see FIG. 1).

In one embodiment, the instances 106 are virtual machine instances. As known in the art, a virtual machine instance is an instance of a software implementation of a machine (i.e. a computer) that executes programs like a physical machine. Each of the servers 502 can be configured to execute an instance manager 508 capable of instantiating and managing instances of computing resources. In the case of virtual machine instances, for example, the instance manager 508 might be a hypervisor or another type of program configured to enable the execution of multiple virtual machine instances on a single server.

It should be appreciated that although the embodiments disclosed herein are described primarily in the context of virtual machine instances, other types of instances of computing resources can be utilized with the concepts and technologies disclosed herein. For instance, the technologies disclosed herein might be utilized with instances of hardware resources, instances of data storage resources, instances of data communications resources, instances of networking resources, instances of database resources, and with other types of instances of computing resources.

The data center 404 also includes one or more server computers 502F reserved for executing software components for managing the operation of the data center 404, the server computers 502, the instances 106, and other resources within the distributed environment 402. In particular, the server computer 502F can execute the resource monitoring component 114 and/or the resource viewing tool 120. Details regarding the operation of each of these components have been provided above. In this regard, it should be appreciated that while these components are illustrated as executing within the distributed environment, computing systems that are external to the distributed environment can also be utilized to execute some or all of these components. Coupled to the server computer 502F can be the quantitative metric data store 116 and the resource metadata store 130, as already described above. These storage devices 116, 130 are readable by the resource viewing tool 120 and writable by the resource monitoring component 106. Also shown in the data center 404 are a deployment service 550 that stores information about when software updates were pushed out to servers and a topology management service 560 that knows the physical location of the servers. In other embodiments, such services can be external to the data center 404. In any event, the deployment service 550 and topology management service 560 can be used to supply and store metrics in the resource metadata store 130. Additionally, not shown, is a component located on the server computers 502 for capturing quantitative metrics and passing the same to the resource monitoring component. The component can capture such metrics as the number of errors on a host server computer, CPU load on a host server computer, memory usage on a host server computer, percentage of malfunctioning instances executing on a host server computer, or a physical characteristic of a host server computer, such as temperature readings from a thermocouple, fan speed, power usage, etc. Such a component can be incorporated into the instance manager 508.

In the example data center 404, an appropriate local area network ("LAN") 504 is utilized to interconnect the server computers 502A-502E and the server computer 502F. The LAN 504 can also be connected to the WAN illustrated in FIG. 4. It should be appreciated that the configuration and network topology illustrated in FIGS. 4 and 5 have been greatly simplified and that many more computing systems, networks, and networking devices may be utilized to interconnect the various computing systems disclosed herein. In one implementation, the resource monitoring component 106 in the data center 404 can collect the quantitative data from other data centers so as to aggregate the data. In this way, each data center can have a local resource monitoring component 106 that communicates with a master resource monitoring component located in one of the data centers 404 for aggregating the data.

Figure 6:
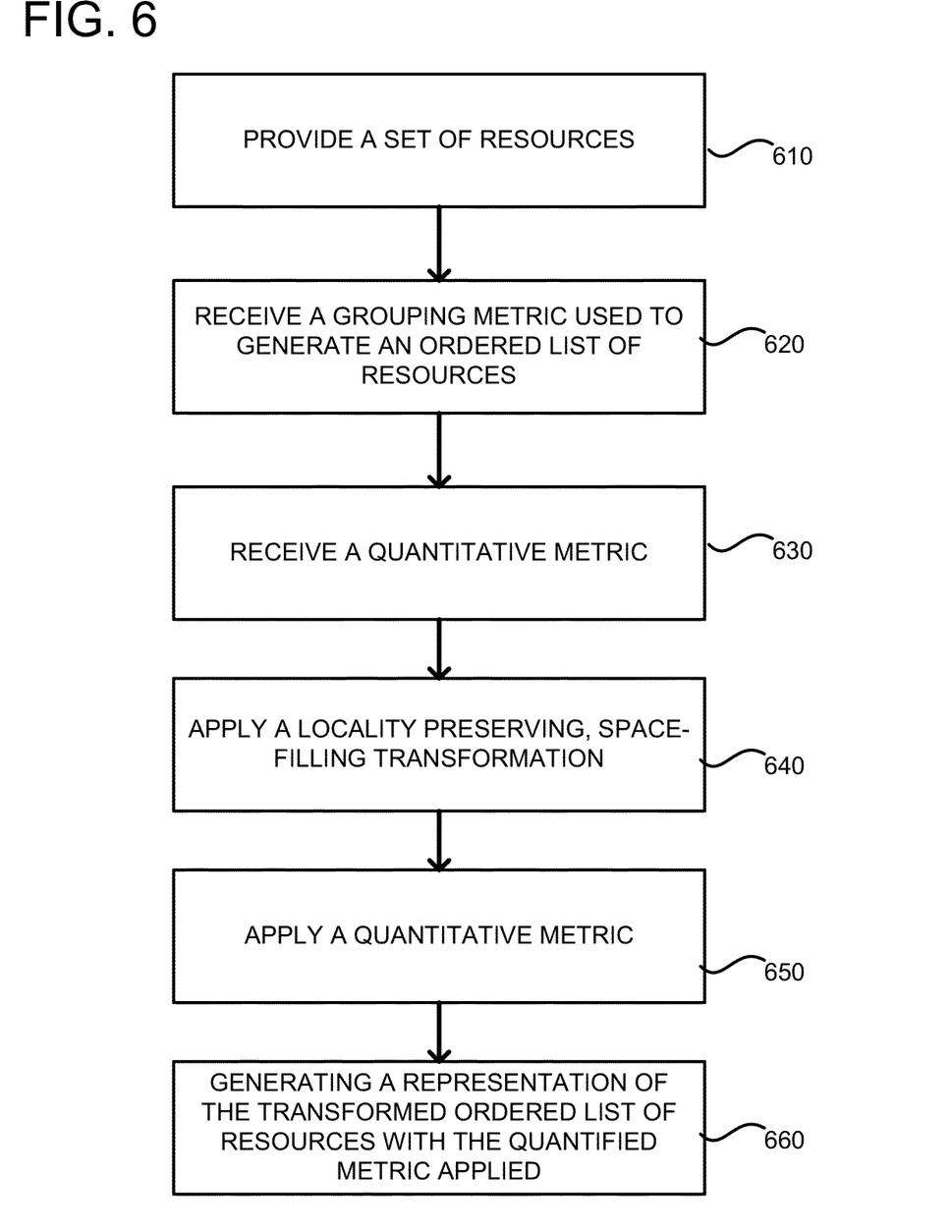
FIG. 6 is a flowchart of a method for visualizing resources in a data center.

FIG. 6 is a flowchart of a method for visualizing resources in a data center. In process block 610, a set of resources are provided. The resources can be hardware resources or software resources, as described above, and can be supplied from a database. Most typically, the embodiments have particular advantage relating to visualizing host server computers. In process block 620, a grouping metric can be received that can be used to generate an ordered list of the resources. The grouping metric can be based on geographic region or time, such as when the resources received updates, or when the resources have been deployed, or have been serviced, etc. The grouping metric can be supplied by the user through a user interface. In process block 630, a quantitative metric can be received. The quantitative metric can include one of the following: number of errors on a host server computer, CPU load on a host server computer, memory usage on a host server computer, network input/output transmission rates, percentage of malfunctioning instances executing on a host server computer, a physical characteristic of a host server computer, etc. Thus, generally, the quantitative metric relates to a problem of the resources to be visualized or a usage characteristic associated with the resources. Other metrics can be used. Which quantitative metric to use can be supplied through a user input. The quantitative metric itself can then be received through database inquiries or directly from a resource monitoring component. In process block 640, the list of resources can be applied to a locality preserving, space filling curve in order to render the list of resources (which are a single dimension list) onto a two dimensional screen. The rendering itself can also represent the resources in three-dimensions. In process block 650, the quantitative metric can be applied by changing a color or appearance for each resource that exceeds a threshold associated with the metric. For example, if the number of malfunctioning instances exceeds 10% then the resource can be viewed as satisfying the metric and the visual representation of the resource can be changed to reflect the same. In process block 660, the transformed list of resources with the quantified metric applied can be generated for display. In particular, a representation of the transformed ordered list can be generated by the resource viewing tool such that is in a format consumable by a user, such as by viewing the representation on a display. It should be recognized, that application of the quantitative metric can occur prior to application of the locality preserving, space filling transformation. The particular order that events occur is not of importance.

Figure 7:
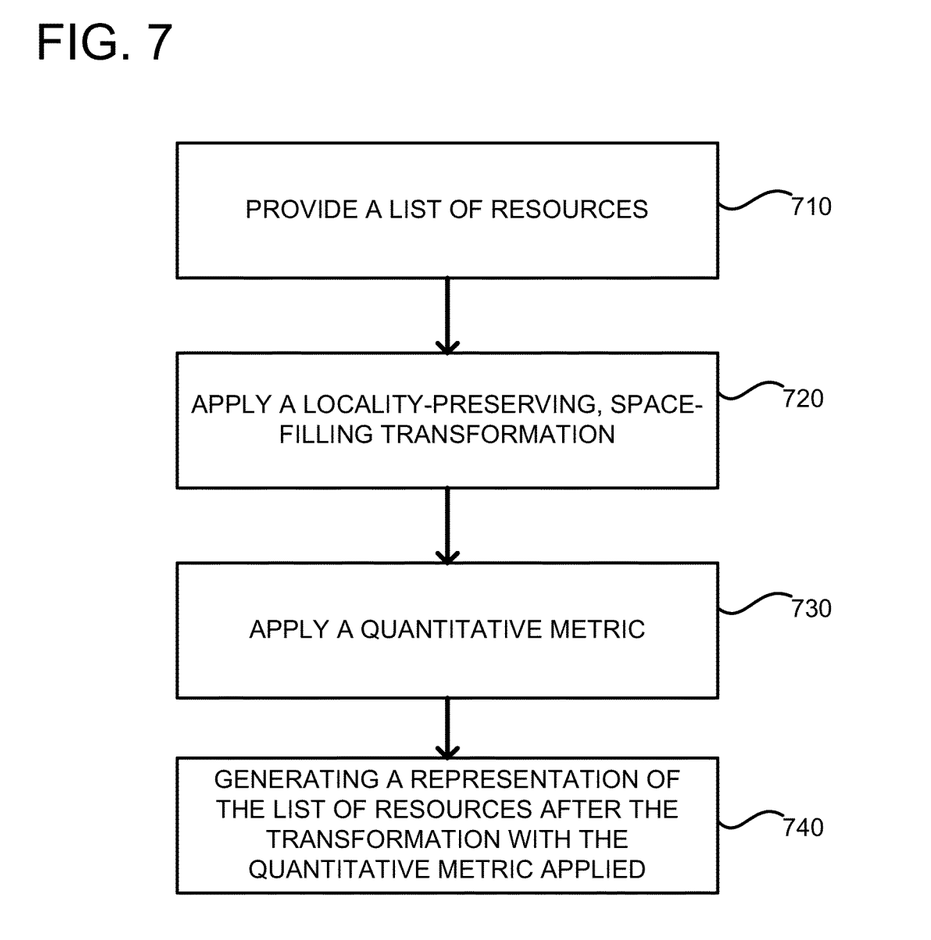
FIG. 7 is a flowchart of another embodiment for visualizing resources in a data center.

FIG. 7 is a flowchart of a method for visualizing resources in a data center according to another embodiment. In process block 710, a list of resources can be provided. The list of resources can already have had the grouping metric applied so as be an ordered list of resources. In process block 720, a locality-preserving, space-filling curve is applied to the list of resources, as already described above. Thus, each resource can have an associated X-Y coordinate associated therewith for plotting on a display. In process block 730, a quantitative metric can be applied to the transformed list of resources. Applying the quantitative metric means that it is visually changed to signify that it exceeded a predetermined threshold associated with the metric. Visual changes include color changes, changes to representation, etc. In process block 740, a representation of the list of resources is generated after the transformation with the quantitative metric applied. Such a representation can be used for display purposes on a client device through a local application or browser.

Figure 8:
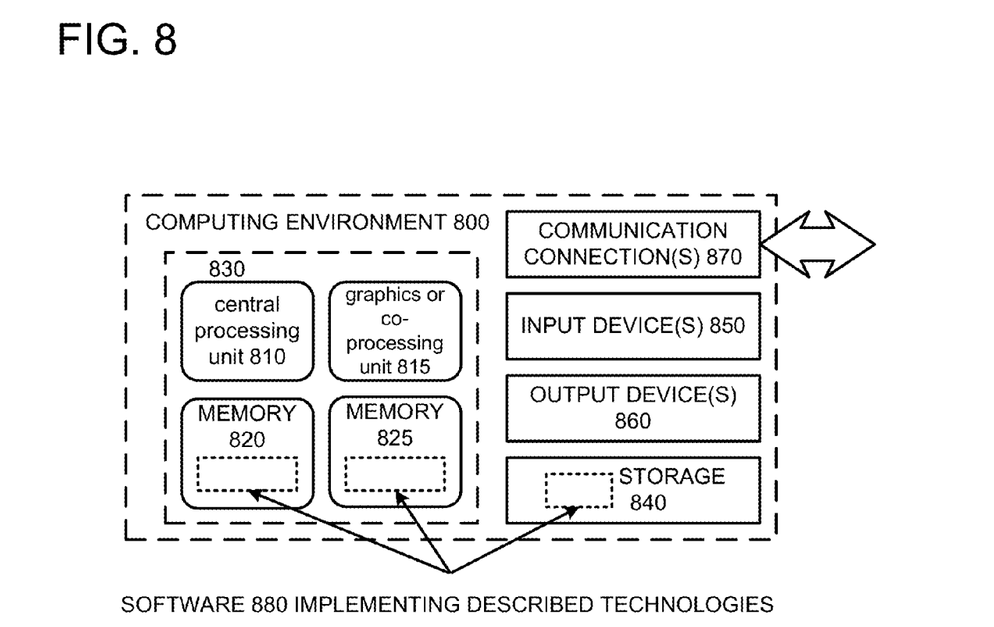
FIG. 8 is a computer architecture diagram showing one illustrative computer hardware architecture for implementing a computing device that can be utilized to implement aspects of the various embodiments described herein.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, the software 880 can implement the resource monitoring component or the resource viewing tool.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of visualizing resources in one or more data centers, comprising:
providing a set of resources, the resources including two or more hardware resources or software resources in the one or more data centers;
receiving a grouping metric, from user input, defining a relationship between the resources in the set of resources so as to generate an ordered list;
receiving a quantitative metric, from a server computer, associated with a problem to be visualized;
applying a locality-preserving, space-filling transformation on the ordered list;
applying the quantitative metric to the transformed ordered list of resources after the locality-preserving, space-filling transformation has been applied; and
generating a heat map representation of the transformed ordered list with the quantitative metric applied so as to visualize a correlation using both the grouping metric and the quantitative metric so as to change a look and feel of the ordered list that satisfy the quantitative metric.

2. The method of claim 1, wherein the heat map is two dimensional with resources satisfying the quantitative metric having a color associated therewith.

3. The method of claim 1, wherein the locality-preserving, space-filling transformation is a Hilbert transformation.

4. The method of claim 1, wherein the resources are host server computers.

5. The method of claim 1, wherein the relationship between the resources relates to time or location.

6. The method of claim 1, wherein the quantitative metric includes one of the following: number of errors on a host server computer, CPU load on a host server computer, memory usage on a host server computer, network input/output transmission rates, percentage of malfunctioning instances executing on a host server computer, or a physical characteristic of a host server computer.

7. A computer-readable storage, which is nonvolatile, having instructions thereon for executing a method of visualizing resources in one or more data centers, the method comprising:
providing an ordered list of resources in the one or more data centers;
applying a locality-preserving, space-filling transformation on the ordered list of resources so as to generate a transformed list of resources;
applying a quantitative metric describing a usage characteristic associated with the ordered list of resources, wherein the quantitative metric is applied to the transformed list of resources after the locality-preserving, space-filling transformation is applied; and generating a heat map representation of the ordered list of resources after the locality-preserving, space-filling transformation with the quantified metric applied so as to visualize a correlation between the ordered list of resources and the quantitative metric by changing an appearance between resources that exceed a threshold associated with the quantitative metric and those that do not exceed the threshold.

8. The computer-readable storage of claim 7, wherein the locality-preserving, space-filling transformation outputs a two-dimensional representation of the list of resources.

9. The computer-readable storage of claim 7, wherein the list of resources are generated by applying a grouping metric to define a relationship between the list of resources.

10. The computer-readable storage of claim 9, wherein the grouping metric is associated with a location of the list of resources.

11. The computer-readable storage of claim 9, wherein applying the locality-preserving, space-filling transformation includes mapping a distance parameter to an x-y coordinate, wherein the distance parameter is associated with each resource's location in the list of resources.

12. The computer-readable storage of claim 7, wherein applying the quantitative metric includes associating a color with each resource that satisfies the quantitative metric.

13. The computer-readable storage of claim 12, wherein satisfying the quantitative metric includes analyzing a usage parameter associated with the data center and determining if the usage parameter exceeds a predetermined threshold.

14. The computer-readable storage of claim 13, wherein the usage parameter includes one of the following: number of errors on a host server computer, CPU load on a host server computer, memory usage on a host server computer, network input/output transmission rates, percentage of malfunctioning instances executing on a host server computer, or a physical characteristic of a host server computer.

15. The computer-readable storage of claim 14, wherein the physical characteristic of the host server computer includes a temperature of the host server computer.

16. The computer-readable storage of claim 7, wherein the list of resources includes an integer number of resources therein, and the method further includes applying a square root to the integer number in order to determine unit dimensions of a displayable area.

17. The computer-readable storage of claim 7, wherein the locality-preserving, space-filling transformation outputs a two-dimensional representation of the list of resources.

18. A system for visualizing resources in one or more data centers, comprising:
a plurality of resources in the one or more data centers;
a resource monitoring component collecting quantitative metrics describing a usage characteristic associated with the resources; and
a resource viewing tool that receives an ordered list of the plurality of resources and applies a locality-preserving, space-filling transformation on the ordered list and applies the quantitative metrics after the locality-preserving, space-filling transformation has been applied so as to visualize, in a heat map, a correlation between the ordered list of the plurality of resources and the quantitative metrics by making a look-and-feel of the resources that satisfy the quantitative metrics appear different than a look-and-feel of resources that do not satisfy the quantitative metrics so as to display a first group of resources that satisfy the quantitative metrics and a second group of resources that do not satisfy the quantitative metrics in a same integrated graphic display.

19. The system of claim 18, wherein the locality-preserving, space-filling transformation outputs a two-dimensional representation of the resources.

20. The system of claim 19, wherein the locality-preserving, space-filling transformation is a Hilbert transformation.

21. The system of claim 18, wherein the plurality of resources are host server computers in the ordered list.

22. The system of claim 18, wherein the quantitative metrics include one of the following: number of errors on a host server computer, CPU load on a host server computer, memory usage on a host server computer, network input/output transmission rates, percentage of malfunctioning instances executing on a host server computer, or a physical characteristic of a host server computer.

23. The system of claim 18, wherein the plurality of resources includes an ordered list with an integer number of resources therein, and the resource viewing tool applies a square root to the integer number in order to determine unit dimensions of a display area.

* * * * *